FIG. 5

United States Patent Office 3,510,846
Patented May 5, 1970

3,510,846
LEFT AND RIGHT SHIFTER
Robert E. Goldschmidt, Hyde Park, Mass., and Don M. Powers, Poughkeepsie, N.Y., assignors to International Business Machines Corporation, Armonk, N.Y., a corporation of New York
Filed July 14, 1967, Ser. No. 653,575
Int. Cl. G11c *19/00*
U.S. Cl. 340—172.5            6 Claims

ABSTRACT OF THE DISCLOSURE

A digital shifter comprising several stages of logic, each of which shifts an input word of bit width X one of several possible amounts in a single direction to achieve a total shift of a desired amount in either direction. All actual shifting takes place in the stages in a single direction with an opposite direction shift being accomplished by single direction shifting an amount equal to the two's complement of the desired amount. Each stage includes a separate bank of AND gates and each bank is responsive to only one of a plurality of shift control inputs. The energized shift control input causes the input word to be passed through the corresponding bank of AND gates to the shifted output positions. The outputs of each bank of AND gates are wired to the stage output terminals to provide a wired-in shift of a given amount. In order to provide a TRUE logical shift of the input word, the input bits which would have been shifted out of the end of the shifter by a conventional shift register are blocked from the final output. All blocking occurs in the second stage in response to blocking control inputs which selectively block certain ones of the AND gates in the second stage. Since actual shifting takes place in only a single direction, the blocking controls block all bits shifted out of the shifter when the desired shift direction is the same as the actual shift direction. However, when the desired shift direction is the opposite of the actual shift direction, the blocking controls block all bits not shifted out of the end of the shifter.

---

Digital shifters are operable to shift input words to the left or right a number of bit positions determined by a command signal, thereby providing output words in a manner similar to that which could be provided by a shift register. The need for digital shifters providing a function similar to that of the present invention, is known in the digital computer art and one particular example of the use of a shifter in a digital computer is shown in U.S. application No. 580,910, now Pat. No. 3,418,638 filed on Sept. 21, 1966, titled "Instruction Processing Unit for Program Branches," and assigned to the assignee of the present invention. In the above-mentioned application, the shifter is shown functionally in FIG. 6B as part of the overall computer system.

The concept of digital shifting includes ring shifting wherein the bit in the lowest order bit position is shifted into the highest order bit position. For example, if a word $X_0X_1X_2 \ldots X_{61}X_{62}X_{63}$ were left shifted two bit positions in a ring shift, the output word would be $$X_2X_3 \ldots X_{61}X_{62}X_{63}X_0X_1$$

Not only have the inputs to positions 2 through 63 moved two positions to the left at the output, but also the inputs at positions 0 and 1 have moved around he ring to occupy the output positions 62 and 63, respectively.

Aside from providing a desired shift between the input and output, it is also necessary in computer applications to block out or insert zeros in output positions otherwise occupied by bits outgated from the last input position. Referring to the example above, for many applications the desired output for a shift left two position operation would be, $X_2X_3 \ldots X_{61}X_{62}X_{63}00$. Thus, the positions otherwise occupied in the output by $X_0$ and $X_1$ are occupied by zeros. The inputs $X_0$ and $X_1$ have been shifted out of the output positions.

A simple shift register is not sufficient for use as a digital shifter in many computer applications be cause of the relatively large amount of time required to effect the proper shift. For example, an ordinary shift register would require 63 clock times to shift left the input 63 bit positions.

In the present invention, the desired shift plus the blocking of the proper output positions is provided in only three stages of logic with each stage being controlled by several control inputs in accordance with an input command. In the specific example to be described herein, the first logic stage is capable of a ring shift of 0, 16, 32 or 48 bit positions to the left; the second stage is capable of shifting 0, 4, 8 or 12 bit positions to the left; the third stage is capable of shifting 0, 1, 2 or 3 bit positions to the left. Consequently, between the input of stage one and the output of stage three a right or left shift of anywhere from 0 to 63 bit positions can be accomplished. All blocking of output positions occurs in the second stage.

Although the bit shifting, as described above, is carried out in a single direction, the output word of the shifter may represent the input word either shifted left or shifted right. This can be understood by considering the following simple example. Assume it is desired to shift the word $X_0 \ldots X_{63}$ two bit positions to the right resulting in the output word $X_{62}X_{63}X_0 \ldots X_{61}$. An examination of the output word indicates that the right shift can be accomplished by ring shifting the input 61 bit positions to the left. The only difference in the actual output between a desired right shift of 2 bit positions and a desired left shift of 61 bit positions is in the output bit positions which are blocked. In the former case, the bit positions 0 and 1 will be blocked. In the latter case, the bit positions 2 through 63 will be blocked.

The function of blocking can best be understood by comparing the present invention with an ordinary shift register. Assume an ordinary shift register of 64 stages, numbered 0 through 63, is filled with a 64 bit word. Upon shifting the contents 2 bit positions to the left the original contents of the 0 and 1 stages will be lost and the 62nd and 63rd stages will now have zeros therein. If the original word were shifted 2 bit positions to the right, the original contents of stages 62 and 63 would be lost, and the stages 0 and 1 would now contain zeros.

In the present invention, the logic circuitry operates to achieve a shift left or a shift right by shifting the word a number of bit positions to the left. Thus, the bits which are effectively shifted out of the high order stage cannot be discarded under all circumstances. Instead, they must be effectively inserted into the lower order end of the shifter in a manner analogous to that achieved in a ring-type shift register. If the original command was a shift left, then the blocking circuit should be operable to block those bits which are effectively shifted out of one end and into the other end. On the other hand, if the original command was a shift right, then the blocking circuit should be operable to block those bits which effectively were not shifted out of the end of the device.

The blocking operation which occurs in the second stage of the shifter is under control of blocking control inputs which, in turn, are controlled by the input command, which indicates the desired amount of shift and the desired shift direction. In response to the blocking controls, the second stage logic is capable of blocking any portion of the second stage output.

It should be noted that blocking takes place to achieve the above-described result which is referred to herein as a logical shift right or logical shift left. On the other hand, the device is also capable of performing the same output function as that which would be achieved in a ring shifter. This can be accomplished by the non-actuation of the blocking circuitry, resulting in a "ring shift."

The invention will be better understood by reference to the drawings and the detailed description of the invention which follows:

In the drawings:

FIG. 5 is a diagram illustrating eight examples of the operation of the shifter stages in response to control inputs;

The specific embodiment to be described herein is a digital shifter capable of operating upon an input word having a 64 bit width to shift the input word to the right or to the left any number of bit positions between 0 and 63. The word having a 64 bit bit width and the maximum possible shift is used herein only as an illustration and it is not intended that the invention be limited to those specific numbers.

Figure 1:
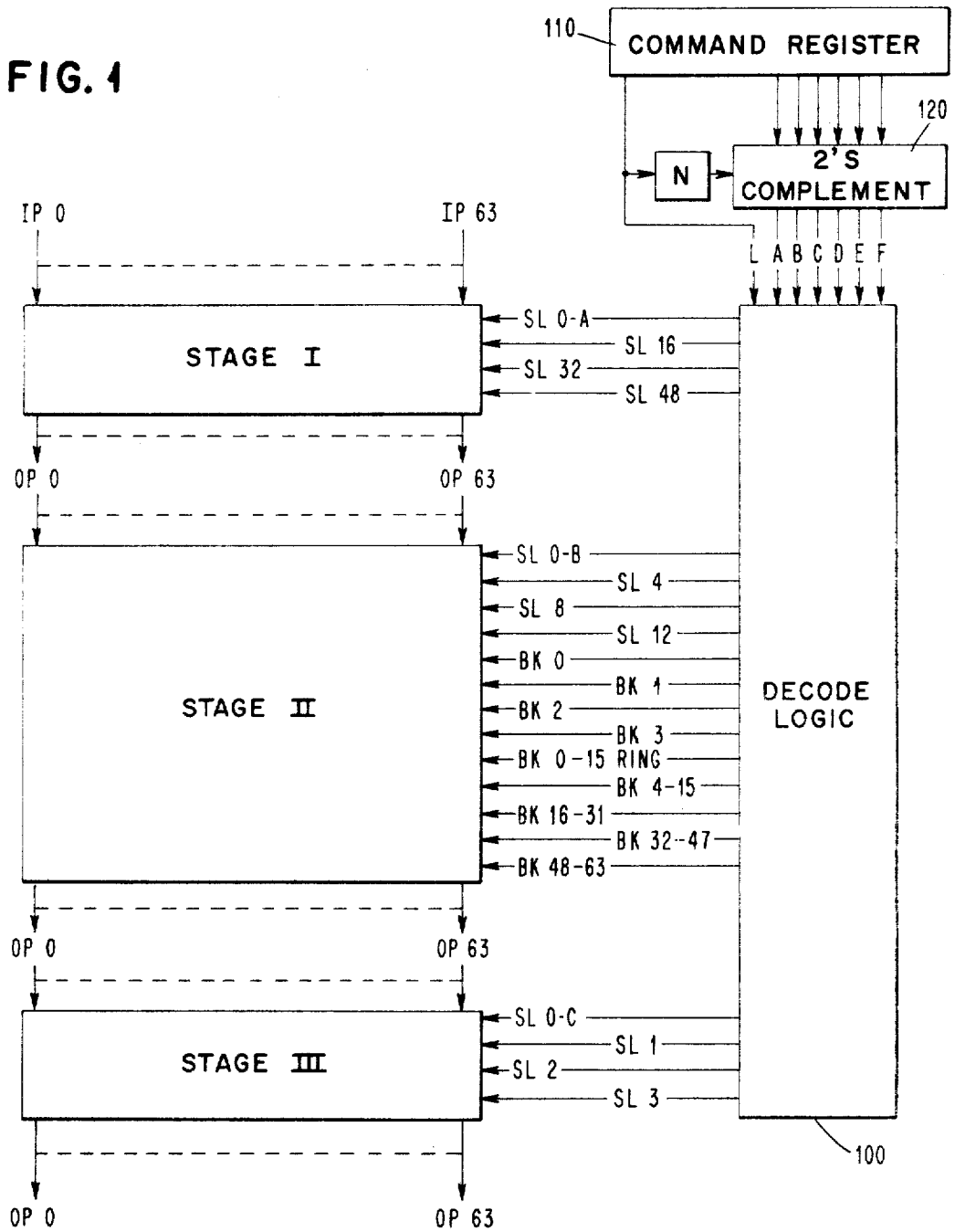
FIG. 1 shows a block diagram of a preferred embodiment of the present invention.

The shifter shown in FIGURE 1 includes three stages of logic. Those stages are Stage I, Stage II and Stage III. Each stage has 64 inputs, numbered 0 through 63, and 64 outputs, also numbered 0 through 63. The inputs to any stage are designated by the letters IP and a number. The letters IP stands for ingated position and the number represents the number of the ingated position. The output of each stage is indicated by the letters OP, standing for outgated position, and the proper outgated position number. It will be noted that the outgated positions from Stage I are ingated to Stage II, and the outgated positions of Stage II are ingated to Stage III. The command input is shown as appearing in command register 110 and represents the amount of shift to be achieved by the shifter and also the desired shift direction. The command is a seven bit input with six bits representing the desired shift amount and the seventh bit representing the shift direction. The six bits representing the amount are applied to two's complement logic block 120 which is under control of the seventh bit. If a left shift is indicated by the seventh bit, the six bits pass through the block 120 unchanged. If a right shift is indicated by the seventh bit, the block 120 provides a six bit output which is the two's complement of the six bit input thereto. The inputs to decoder logic are labeled L, A, B, C, D, E and F. The letter L represents a shift left command and consequently, $\bar{L}$ represents a shift right command. The letters A through F represent in binary form the number of bit positions the input word will actually be shifted to the left.

The decode logic apparatus 100 is operable to provide the proper shifting control outputs to Stages I, II and III and the proper blocking control outputs to Stage II. The shifting controls applied to Stage I are SL0-A SL16, SL32, and SL48, controlling respectively a shift around the ring of 0, 16, 32 and 48 bit positions to the left. In logic terminology, only one of the controls applied to Stage I is TRUE for a given operation. If the control SL0-A is TRUE, the bits will appear at the outgated positions which correspond to the ingated positions. In other words, the bit ingated at IP0 will be outgated at OP0, etc. If the control SL16 is TRUE, all input bits will be outgated at 16 positions to the left of the ingated positions. In other words, the bit ingated at IP0 will be outgated at OP48, the bit ingated at IP1 will be outgated at OP49, the bit at IP16 will be outgated at OP0, etc. In the manner, the controls SL32 and SL48 cause Stage I to shift the ingated bits ringwise 32 and 48 positions to the left, respectively. It will be noted that there is no blocking in Stage I.

Stage II receives the shifting controls SL0, SL4, SL8, and SL12 which cause the ingated bits to be shifted left 0, 4, 8 and 12 bit positions respectively. Stage III receives input controls SL0–C, SL1, SL2 and SL3 which cause the input to Stage III to be shifted 0, 1, 2 and 3 bit positions to the left, respectively, Thus, by selecting one of the control inputs to each of the three stages the word ingated to Stage I can be shifted to the left any number of bit positions from 0 to 63. Since a right shift of amount $n$ can be effected by shifting the input word $64-n$ positions to the left, the input command which indicates the total amount of shift desired is applied to the decode logic in two's complement form whenever a right shift command is initiated.

In order to achieve the desired function for Stage I, the stage may include four AND gates for each input lead, each input lead would be applied as one of the inputs to the corresponding four AND gates, and the other inputs would be the controls SL0–A, SL16, SL32 and SL48, respectively. Since only one of the controls is TRUE for any given operation, only one of the AND gates corresponding to each input will be energized, thereby providing the input bits to the proper outgated positions. An example of part of the circuitry for Stage I is illustrated in FIG. 2, the remaining circuitry which is not shown being substantially identical and obvious to a person skilled in the art in view of what is shown in FIG. 2.

Figure 2:
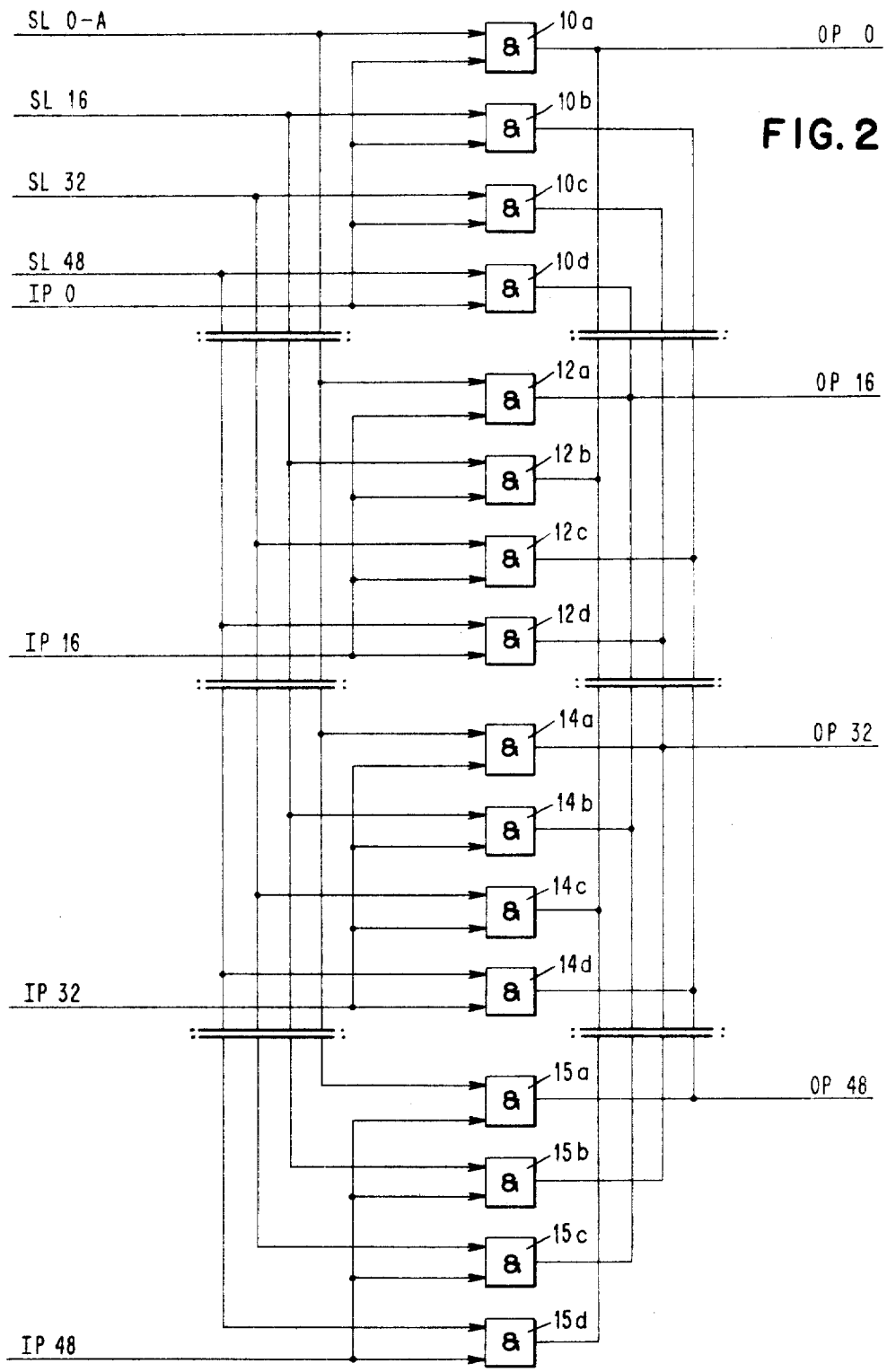
FIG. 2 is an illustration of a portion of the logic of Stage I of the shifter.

FIG. 2 shows only the logic circuitry for the inputs IP0, IP16, IP32 and IP48. The input IP0 is applied to AND gates 10a through 10d, the input IP16 is applied to AND gates 12a through 12d, IP32 is applied to AND gates 14a through 14d, and IP48 is applied to AND gates 15a through 15d. The input SL–A is applied to AND gates 10a, 12a, 14a and 15a. The input SL16 is applied to 10b, 12b, 14b and 15b. The input SL32 is applied to 10c, 12c, 14c and 15c. The input SL48 is applied to 10d, 12d, 14d and 15d. Due to the circuitry shown in FIG. 2, whenever SL0–A is TRUE, the bit at IP0 will be outgated via AND gate 10a to OP0, the bit at IP16 will be outgated via AND gate 12a to OP16, the bit at IP32 will be outgated via AND gate 14a at OP32, and the bit at IP48 will be outgated via AND gate 15a to OP48. The result of SL0–A being TRUE is a zero shift of all input bits. If SL16 is TRUE, the bit at IP0 will be outgated via AND gate 10b at OP48 and the bits at IP16, IP32 and IP48 will be outgated at OP0, OP16, and OP32, respectively. The result is a left shift of 16 bit positions. The operation in response to SL32 or SL48 being TRUE is readily apparent from the drawing.

Figure 3:
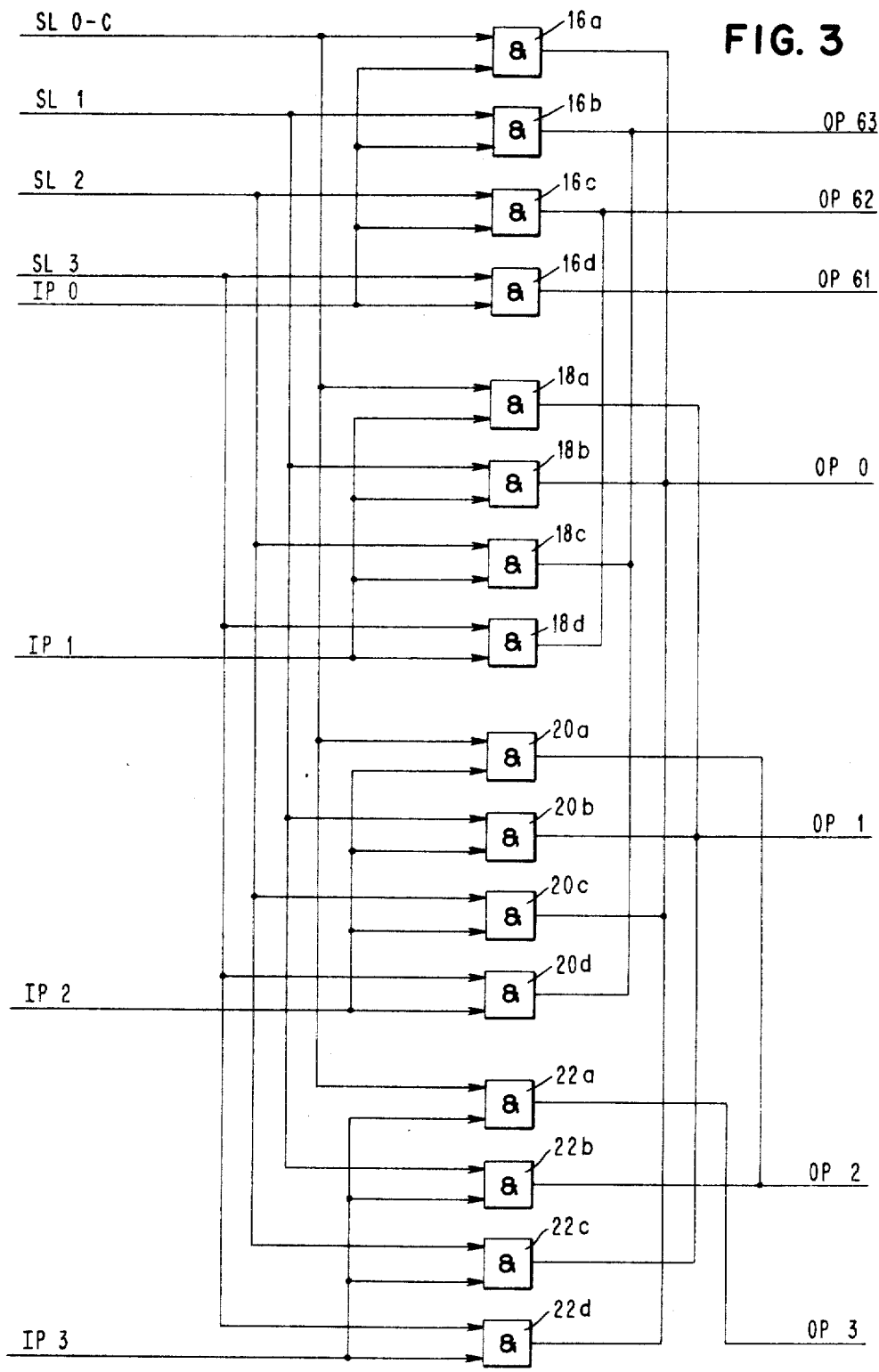
FIG. 3 is an illustration of a portion of the logic of Stage III of the shifter.

The logic circuitry of Stage III may be identical to that of Stage I, the only difference being in the shift control inputs received by the logic circuitry. In FIG. 3, only the inputs IP0 through IP3 and there correspoinding four AND gates are shown, but it will be apparent to those having ordinary skill in the art from the parial showing of FIG. 3 that the remainder of the logic will be substantially identical. As shown in the drawing, OP0 is applied to AND gate 16a through 16d, IP1 is applied to AND gate 18a through 18d, IP2 is applied to AND gates 20a through 20d, and IP3 is applied to AND gates 22a through 22d. The control input SL0–C is applied to AND gates 16a, 18a, 20a and 22a. The control input SL1 is applied to AND gates 16b, 18b, 20b and 22b. The control input SL2 is applied to AND gates 16c, 18c, 20c and 22c. The control input SL3 is applied through AND gates 16d, 18d, 20d and 22d. The operation of the logic shown in FIG. 3 is apparent from the drawing. When SL0–C is TRUE, the bits appearing at IP0 through IP3 will be outgated respectively to OP0, OP1, OP2, and OP3. When SL1 is TRUE, the bits appearing at IP0 through IP3 will be outgated respectively at OP63, OP0, OP1 and OP2. When SL2 is TRUE, the bits applied at IP0 through IP3 will be outgated respectively at OP62, OP63, OP0 and OP1. When SL3 is true, the input bits at IP0 through IP3 will be outgated respectively at OP61, OP62, OP63 and OP0.

As explained thus far, Stage I shifts the input either 0, 16, 32 or 48 positions to the left, and Stage III shifts the input thereto either 0, 1, 2 or 3 bit positions to the left. In each case the logic comprises four AND gates for each input with each of the four AND gates for any given input being controlled by a separate one of the shift control inputs. In Stage II, the logic must be different from that of Stages I and III because of the blocking function achieved in Stage II.

Figure 4:
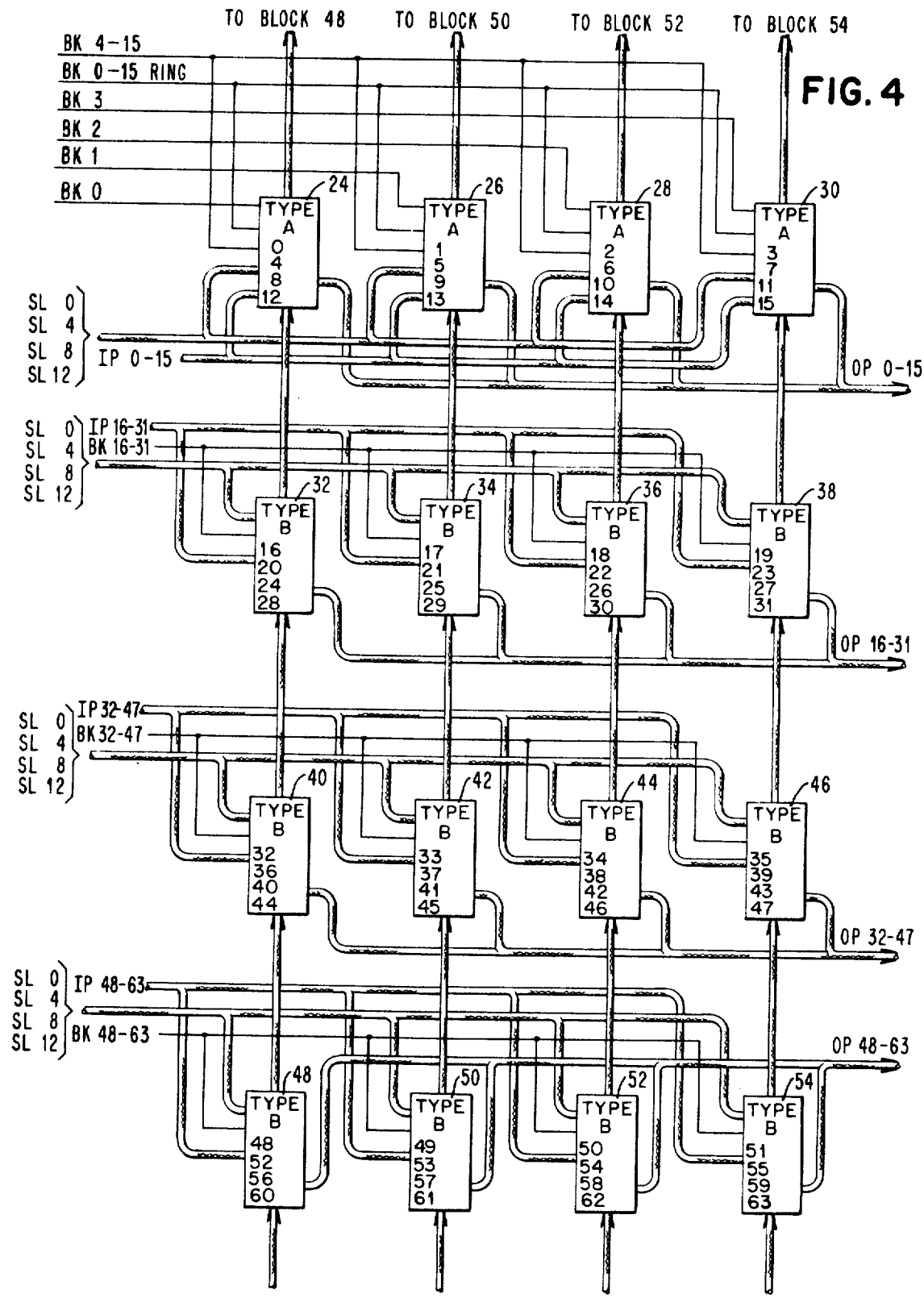
FIG. 4 is a block diagram illustrating the logic of Stage II of the shifter.

Since Stage II, which is shown in FIG. 4, also receives four shifting controls, SL0-B, SL4, SL8 and SL12, a portion of its logic is similar to the logic of Stages I and II. That is, each ingated position is applied to four individual AND gates, and the AND gate which is energized will be determined by the shifting control which is TRUE. However, unlike the logic of Stages I and III, in Stage II some of the AND gates are controlled by the blocking controls. Thus, in some circumstances, and AND gate which would otherwise be energized to pass a bit at an ingated position to be desired outgated position will be blocked due to the presence of a particular blocking control.

In FIG. 4, the logic of Stage II is shown as being divided into 16 individual logic blocks, 24 through 54. Each of the 16 logic blocks has four ingated positions applied thereto and contains four AND gates for each of the ingated positions applied thereto. The logic blocks may also contain other logical elements which will be explained in more detail hereafter. None of the logic receives the same ingated positions. The logic blocks blocks receives the same ingated positions. The logic blocks indicated as Type A in FIG. 4 are identical, and the logic blocks indicated as Type B are also identical. Aside from receiving four ingated positions as inputs, each logic block receives the four shift controls and certain ones of the blocking controls as inputs thereto. The ingated positions which are applied to the individual logic blocks are indicated by the numbers in the lower left of each of the logic blocks. Ingated positions 0, 4, 8 and 12 are applied to logic block 24; ingated positions 1, 5, 9 and 13 are applied to logic block 26; ingated positions 2, 6, 10 and 14 are applied to logic block 28; ingated positions 3, 7, 11 and 15 are applied to logic block 30; etc. As is apparent from the drawing, each of the rows of logic blocks receives 16 of the ingated positions. Each of the ingated positions 0 through 15 are applied to one of the first row logic blocks, 24, 26, 28 and 30. Each of the ingated positions 16 through 31 are applied to one of the second row logic blocks, 32, 34, 36 and 38. Each of the ingated positions 32 through 47 are applied to one of the row three logic blocks, 40, 42, 44 and 46. Each of the ingated positions 48 through 63 is applied to one of the row four logic blocks, 48, 50, 52 and 54.

Since each outgated position is tied to the outputs of four AND gates, and also since the four AND gates tied to any given outgated position will not necessarily be in the same logic block, the AND gate outputs from some of the blocks will be tied to the AND gate outputs from other blocks. The interconnections between the AND gate outputs of the different blocks are indicated by the vertical lead lines connected in FIG. 4 between adjacent blocks in each column. For example, the following AND gates have their outputs tied to the outgated position OP8:

(1) The AND gate in block 24 which receives inputs IP8 and SL0-B.

(2) The AND gate in block 24 which receives inputs IP12 and SL4.

(3) The AND gate in block 32 which receives inputs IP16 and SL8.

(4) The AND gate in block 32 which receives inputs IP20 and SL12.

The nine blocking controls and their functions will now be explained. In connection with the explanation of the blocking controls, all ingated positions and outgated positions are referenced to the second stage since that is the only stage in which blocking is accomplished.

BK0 blocks any output bit from appearing at OP0. Since the only ingated bits which can be outgated to position 0 are IP0, IP4, IP8 and IP12, the control BK0 need only be logically related to IP0, IP4, IP8 and IP12. Thus, in FIG. 4, the control BK0 is shown being applied only to logic block 24.

BK1 blocks any output bit from appearing at OP1. Since the only ingated bits which can be outgated to position 1 are IP1, IP5, IP9 and IP13, the control BK1 need only be related to those ingated positions. Thus, BK1 is shown in FIG. 4 as being applied only to block 26.

BK2 blocks any output bit from appearing at OP2. Since the only ingated bits which can be outgated to position 2 are IP2, IP6, IP10 and IP14, the control BK2 need only be logically related to those ingated positions. Thus, the control BK2 is shown in FIG. 4 as being applied only to block 28.

BK3 blocks any output bit from appearing at OP3. Since the only ingated bits which can be outgated to position 3 are IP3, IP7, IP11 and IP15, the control BK3 need only be logically related to those ingated positions. Thus, the control BK3 is shown in FIG. 4 as being applied only to logic block 30.

BK0-15 RING blocks any of the input bits at IP0 through IP15 from appearing at any of the output positions OP48 through OP63. Since the control BK0-15 RING is logically related only to ingated positions 0 through 15, it is applied only to logic blocks 24, 26, 28 and 30.

BK4-15 blocks any bits which appear at ingated positions 4 through 15 from appearing at any of the outgated positions 4 through 15. Since the control BK4-15 is logically related only to ingated positions IP4 through IP15, it is applied only to logic blocks 24, 26, 28 and 30.

BK16-31 blocks the input bits appearing at IP16 through IP31 from appearing anywhere in the output of the second stage, and therefore, is applied to logic blocks 32, 34, 36 and 38.

BK32-47 blocks the bits appearing at IP32 through IP47 from appearing anywhere at the output of the second stage, and therefore, is applied to logic blocks 40, 42, 44 and 46.

BK48-63 blocks any inputs appearing input positions IP48 through IP63 from appearing anywhere in the output of the second stage, and therefore, is applied to logic blocks 48, 50, 52 and 54.

Figure 5:
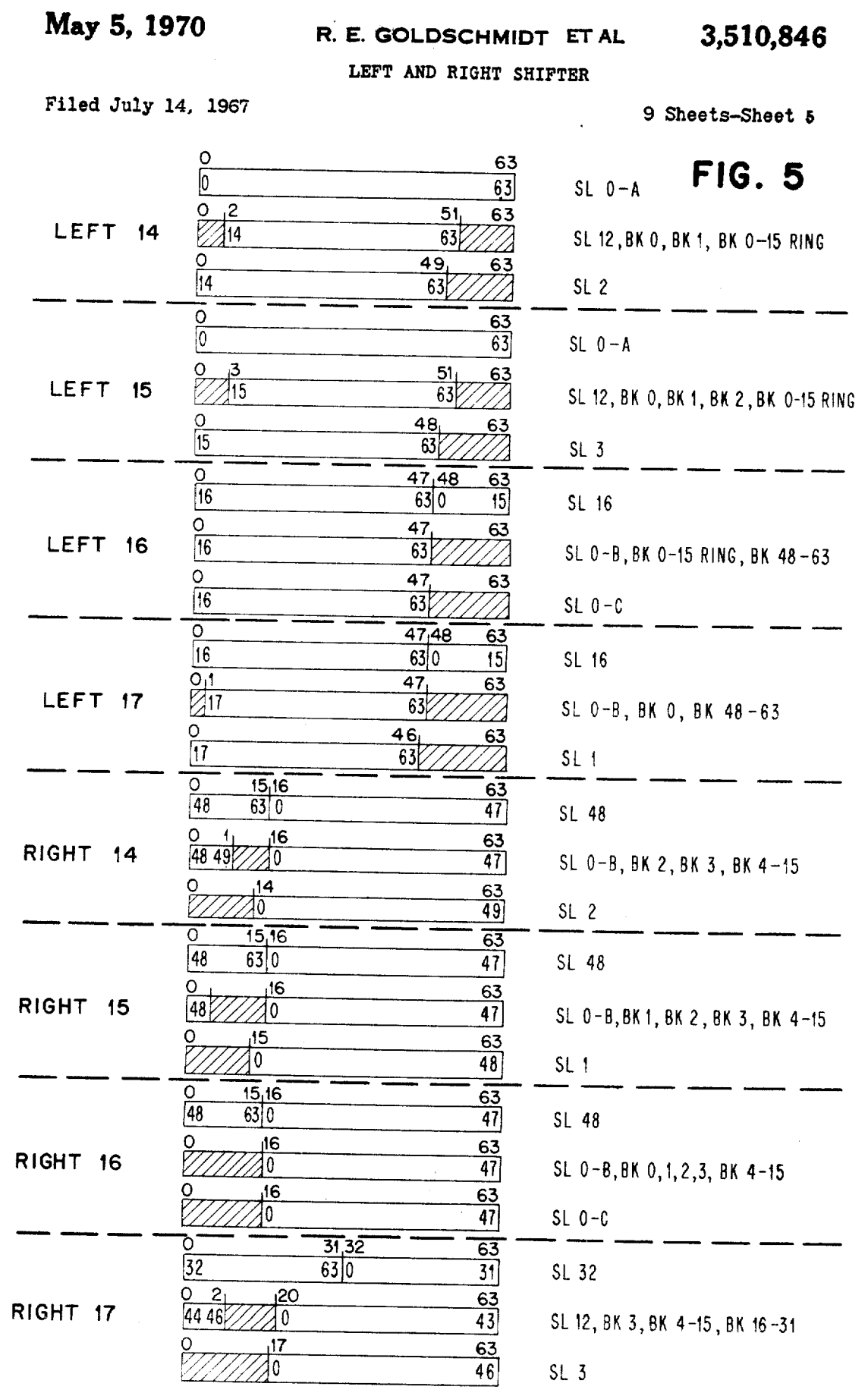

By the proper combination of shift controls and blocking controls, the 64 bit input word may be shifted any desired amount left or right. Eight examples of how the shift controls and blocking controls combined to accomplish the desired logical shifts are shown in FIG. 5. The illustration of each example in FIG. 5 includes three rectangles. The numbers 0 to 63 appearing on the top of each rectangle indicate the original positions of the input word applied to Stage I. The numbers within the individual rectangles represent the shifted position of the input word in the first, second and third stages. The crossed hatched portion of each rectangle represents the blocked portion of the output. The control symbols at the right of each of the rectangles indicates the shift controls and blocking controls applied to the respective stages. It will be noted that the blocked positions in the output of Stage II are always effectively zeros and are applied as inputs to Stage III and thus may be shifted along with the remaining unblocked portion of the output word of Stage II. Two of the examples will now be explained.

In the first example, the command is shift left 14. To achieve a shift left of 14 bit positions, the Stages I, II and III receive shift controls SL0–A, SL12 and SL2, respectively, totaling a shift left of 14 positions. As indicated in the first rectangle, the word is not shifted at all by the first stage. As indicated by the second rectangle, the word is shifted 12 positions to the left, resulting in the bit originally at 14 now appearing at position 2 and the bit originally at 63 now appearing at position 51. Since it is necessary to block all bits shifted out of the left end for a logical left shift operation it will be necessary to block original bits 0 through 13 in the final output. This is accomplished by applying blocking controls BK0, BK1 and BK0–15 RING to the second stage. BK0–15 RING blocks any inputs to Stage II from IP0 to IP15 from appearing at output positions OP48 through OP63. Thus, BK0–15 RING blocks the outputs at positions OP52 to OP63. BK0 blocks the output at position 0 and BK1 blocks the output at position 1. When the output of Stage II is shifted 2 positions to the left in Stage III, bit 14 moves over to the 0 position and the two blocked positions on the left in Stage II are now effectively shifted as zeros into positions 62 and 63 of the output word.

The result of a left shift 14 command will now be compared with the result of a right shift 14 command, illustrated in FIG. 5 as Example 5. Since, as described above, all actual shifting is to the left, a right shift of 14 is accomplished by left shifting the input word 50 bits positions (64−14=50). To accomplish blocking, instead of blocking the bits which are effectively shifted out of the left end of the device, those bits which are not shifted out of the left end of the device are blocked. As shown in Example 5, to achieve a shifting of 50 bit positions to the left, the shift controls SL48, SL0, and SL2 are applied to the Stages I, II and III, respectively. Also, blocking controls BK2, BK3 and BK4–15 are applied to Stage II. In Stage I, the input word is shifted 48 positions to the left resulting in the original bit at position 0 now appearing at position 16, as illustrated in the first rectangle. In the second stage, as indicated by the second rectangle, there is no shift of the 64 bit word. Since the bits 0 through 47 were effectively shifted out of the left end by Stage I, those bits should not be blocked in Stage II. The remaining bits, 48 through 63 have not been effectively shifted out of the left end, but two of those bits, 48 and 49, will be shifted out of the left end due to the control SL2 being applied to Stage III. Therefore it is necessary to block bits 50 through 63 in Stage II since they will be the only bits which ultimately are not effectively shifted out of the left end. It will be noted that absent blocking, bits 50 through 63 are applied to Stage II at input positions 2 through 15 and would appear at the Stage II output positions 2 through 15. The blocking control BK2 blocks the output at position 2; the blocking control BK3 blocks the output at position 3; the blocking control 4–15 prevents the bits at IP4 through 15 from appearing at OP4 through 15. The final result is achieved by shifting the word two bit positions to the left in Stage III. The final result, as shown in the third rectangle, is equivalent to a right shift of 14 bit positions with all bits shifted out of the right-hand end being lost.

As indicated above, the Type A logic blocks of FIG. 4 are identical and the Type B logic blocks of FIG. 4 are also identical. It was also indicated that each of the ingated positions was applied to four individual AND gates and that each of the AND gates was energized by a separate one of the shifting controls and selected ones of the blocking controls. Since there are only two different types of logic blocks involved in FIG. 4, logic blocks 32 and 24 will be explained in detail with reference to the logic drawings in FIGS. 6A and 6B, respectively.

Figure 6A:
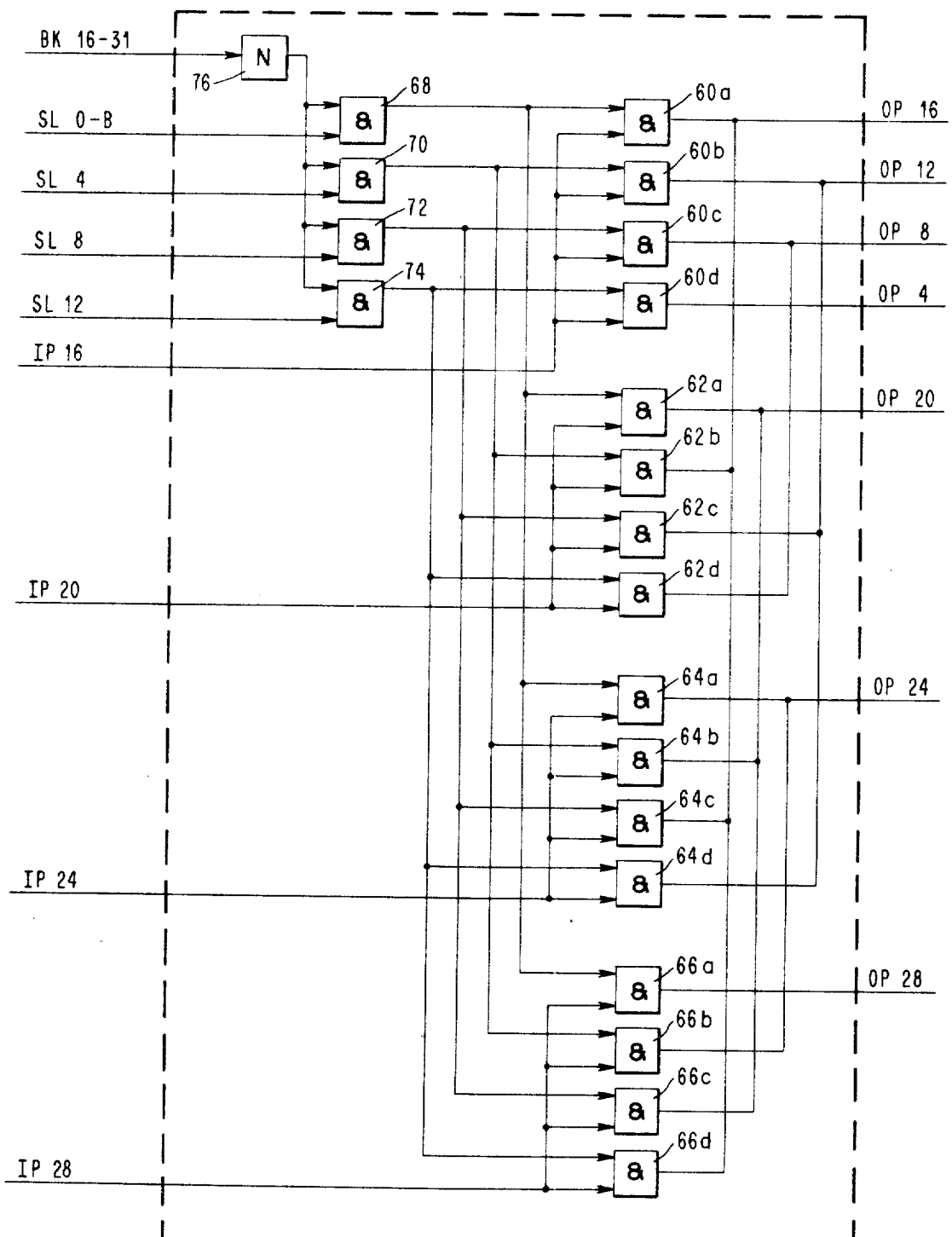
FIGS. 6A and 6B represent portions of the block diagram shown in FIG. 4.

Logic block 32 of FIG. 4 is shown in detail in FIG. 6A and receives inputs IP16, IP20, IP24, IP28, SL0, SL4, SL8, SL16, and BK16–31. IP16 is applied to the four AND gates 60a through 60d; IP20 is applied to AND gates 62a through 62d; IP24 is applied to AND gates 64a through 64d; IP28 is applied to AND gates 66a through 66d. In the absence of blocking control BK16–31, the upper input to each of the AND gates 68 through 74 will be energized. Thus, for example, if SL0 is TRUE, AND gate 60a will be energized to pass the input bit at IP16 to OP16, AND gate 62a will be energized to pass the input bit at IP20 to OP20, AND gate 64a will be energized to pass the input bit at IP24 to OP24, and AND gate 66a will be energized to pass the input bit at IP28 to OP28. It is apparent that in the absence of BK16–31 the logic of FIG. 6A operates in the identical manner to the logic of FIGS. 2 and 3. As stated above, the purpose of blocking control BK16–31 is to block the input bits at input positions 16–31 from appearing anywhere in the output of the second stage. The function of the blocking control can therefore be accomplished by causing all of the AND gates associated with IP16 through IP31 to be de-energized whenever BK16–31 is TRUE. This is accomplished in FIG. 6A by applying the input BK16–31 through a conventional NOT or INVERT gate 76 whose output is applied in parallel to AND gates 68, 70, 72 and 74. Thus, whenever BK16–31 is TRUE, the AND gates 68 through 74 will be deenergized preventing any of the shifting controls from being applied to the AND gates 60 through 66.

Figure 6B:
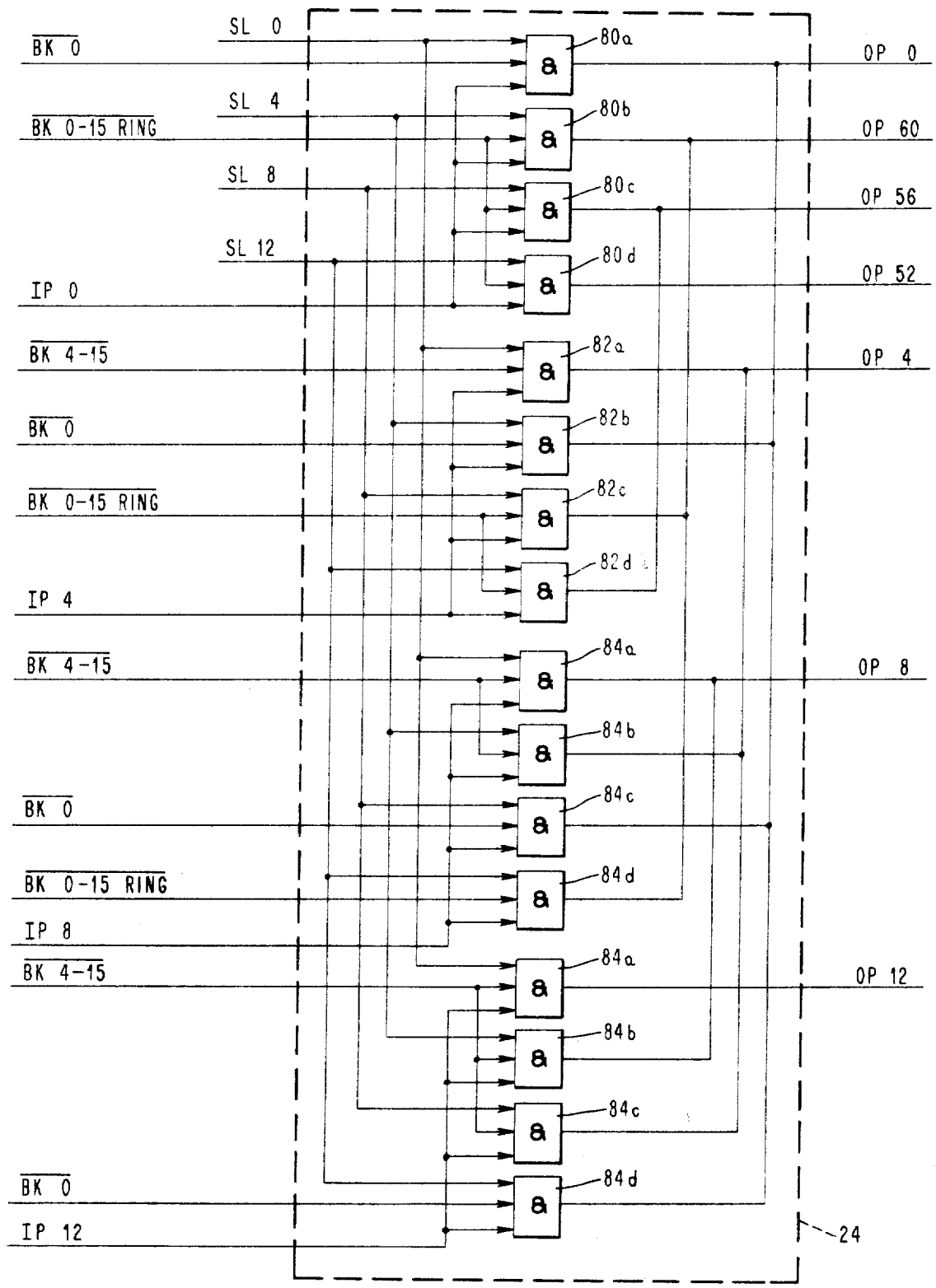

The Type A block, specifically logic block 24 of FIG. 4, is shown in more detail in FIG. 6B. Each of the ingated positions is applied to four AND gates and each of the shifting controls is applied to one of the four AND gates. Neglecting the blocking controls for the moment, when SL0–B is TRUE, IP0 is gated through AND gate 80a to OP0, IP4 is gated through 82a to OP4, IP8 is gated through AND gate 84a to OP8, and IP12 is gated through AND gate 86a to OP12. When SL4 is TRUE, IP0 is gated through AND gate 80b to OP60, IP4 is gated through AND gate 82b to OP0, IP8 is gated through AND gate 84b to IP4, and IP12 is gated through AND gate 86b to IP8. The blocking controls applied to logic block 24 are BK–0, BK0–15 RING, and BK4–15. In FIG. 6B, the blocking controls listed above are not shown, instead the inputs $\overline{BK-0}$, $\overline{BK0-15\ RING}$, and $\overline{BK4-15}$, are illustrated as being applied to selected ones of the AND gates 80 through 86. As will be apparent to one skilled in the art to which the invention pertains, the illustrated inputs may be generated by applying the control inputs to NOT or INVERT gates as with the BK16–31 input in FIG. 6A. As is apparent from the drawings, in the absence of any of the blocking controls BK–0, BK0–15 RING and BK4–15, the inputs $\overline{BK-0}$, $\overline{BK0-15\ RING}$, and $\overline{BK4-15}$ will be energized allowing the logic to operate in the manner previously described.

As stated above, the purpose of blocking control BK0 is to block any output bit from appearing at position OP0 in Stage II. Thus, the input $\overline{BK0}$ is applied to all of the AND gates which are outgated to OP0. Those AND gates are 80a, 82b, 84c, and 86d. Whenever BK0 is TRUE, the latter AND gates will not pass any inputs to OP0.

As stated above, the purpose of BK4–15 is to prevent any bits appearing at positions IP4 through IP15 from being outgated at positions OP4 through OP15. The latter function is accomplished by applying the input $\overline{BK4-15}$ to all of the AND gates in the logic block whose outputs are tied to any one of the output positions 4 through 15. In FIG. 6B, $\overline{BK4-15}$ is applied to AND gates 82a, 84a, 84b, 86a, 86b, and 86c. It will be noted that $\overline{BK4-15}$ is not applied to any of the AND gates to which IP0 is applied. The reason for that is because the blocking control BK4–15 is concerned only with the inputs 4–15 which are gated to the outputs 4–15.

Also, as explained above, the purpose of blocking control BK0–15 RING is to prevent any bits appearing at input positions IP0 through IP15 from being outgated to output positions OP48 through OP63. This function is accomplished by applying the input $\overline{BK0-15\ RING}$ to each of the AND gates in the Type A logic blocks whose outputs are outgated to any one of the output positions OP48 through OP63. As shown in FIG. 6B, $\overline{BK0-15}$ $\overline{RING}$ is applied to AND gates 80b, 80c, 82b, 82c, 82d and 84d.

Thus far, the logic of the three stages of the shifter and the control inputs have been explained in detail. In order to provide the proper shift and the proper blocking for any given command, some decoding logic is necessary to receive the input command and energize the proper control inputs to the three stages. One specific example of logic which may be used to energize the proper controls will now be explained.

In the specific example described herein, the maximum possible shift, either right or left, is 63 bit positions. A command of 7 bit width will be sufficient to designate the amount of shift and the direction of shift; 6 bits representing the shift amount and the 7th bit representing the direction of the shift. If the 7th bit is arbitrarily designated as L, then L means a shift left command and $\overline{L}$ means a shift right command. Since a right shift of amount $n$ is actually achieved by shifting left an amount $64-n$, the 6 bits representing the amount of shift is applied to the decoder in two's complement form whenever an $\overline{L}$ is present. Consequently, the input to the decoder will always be in the form of a 6 bit word designating the amount to be shifted left and a single bit, either L or $\overline{L}$, indicating the command shift direction.

For the purpose of illustrating the logic of the decoding circuit, the following alphabetic symbols are used to indicate the input to the decoder: $A=32$; $B=16$; $C=8$; $D=4$; $E=2$; $F=1$. Thus, it will be apparent to those having ordinary skill in the art to which the invention pertains, that the controlled inputs SL0–A, SL48, SL32, SL16, SL0–B, SL4, SL8, SL12, SL0–C, SL01, SL02, and SL03 are determined solely by the inputs A through F, and the inputs L and $\overline{L}$ are used only to determine the proper blocking controls to be applied to the stages. The Boolean expressions for the shift controls are as follows:

$SL48=AB$.—A shift of 48 positions in the first stage is to be accomplished whenever the decoder input is 48 or above.

$SL32=A\overline{B}$.—A shift of 32 positions in the first stage is to be accomplished whenever the decoder input is equal to or greater than 32 but less than 48.

$SL16=\overline{A}B$.—A shift of 16 positions in the first stage is to be accomplished whenever the decoder input is equal to or greater than 16 but less than 31.

$SL0-A=\overline{A}\overline{B}$.—A zero shift in the first stage is to be accomplished whenever the decoder input is less than 16.

$SL12=CD$.—A shift of 12 in the second stage is to be accomplished whenever C, which is 8, and D, which is 4, are TRUE.

$SL8=C\overline{D}$.—A shift of 8 in the second stage is to be accomplished whenever C is TRUE and D is FALSE.

$SL4=\overline{C}D$.—A shift of 4 in the second stage is to be accomplished whenever C is FALSE and D is TRUE.

$SL0-B=\overline{C}\overline{D}$.—A shift of zero in the second stage is to be accomplished whenever both C and D are FALSE.

$SL3=EF$.—A shift of 3 in the first stage is to be accomplished whenever E, which is 2, and F, which is 1, are TRUE.

$SL2=E\overline{F}$.—A shift of 2 in the third stage is to be accomplished whenever E is TRUE and F is FALSE.

$SL1=\overline{E}F$.—A shift of 1 in the third stage is to be accomplished whenever E is FALSE and F is TRUE.

$SL0-C=\overline{E}\overline{F}$.—A shift of zero in the third stage is to be accomplished whenever both E and F are FALSE.

Before giving the Boolean expressions for the blocking controls, the blocking controls will be explained first for an assumed command left shift and then for an assumed command right shift in order that the relation between the blocking controls and the shifting controls may be better understood. The following discussion assumes that there is a command left shift, and therefore it is necessary to block all of the bits which are effectively shifted out of the left end of the shifter.

BK0–15 RING will always be TRUE because it is only concerned with bits which are effectively shifted out of the left end of the shifter.

BK0, which blocks the output from Stage II at OP0, should be TRUE whenever there will be a further positive shift of any amount in Stage III. Since SL1, SL2, and SL3 will cause a positive left shift in Stage III, BK0 should be TRUE whenever any one of those shift controls is TRUE.

BK1, which blocks the output at OP1, should be TRUE whenever the output from Stage II will be shifted at least 2 positions in Stage III. Since that can be accomplished by the presence of either SL2 or SL3, BK1 should be TRUE whenever either SL2 or SL3 is TRUE.

BK2, which blocks the output of Stage II at OP2, should be 0 whenever the output of Stage II will be shifted at least 3 positions to the left in Stage III. Since the only shift control which can accomplish that result is SL3, BK2 should be TRUE whenever SL3 is TRUE.

BK3, which blocks the output of Stage II at OP3, should be TRUE whenever the output of Stage II at OP3 would be shifted out of the left end of the shifter by a positive shift in Stage III. Since the maximum shift possible in Stage III is a shift left of 3 bit positions, the output of Stage II at OP3 can never be shifted out of the left end by any shift in Stage III, and therefore, BK3 will always be FALSE.

BK4–15 only concerns bits which are received at IP4 through IP15 and are outgated to OP4 through OP15, and therefore, only concerns bits which are not gated out of the left end of the shifter. Thus, BK4–15 is always FALSE.

BK16–31 blocks the outputs of Stage II at positions OP15 through OP31. Since the outputs of Stage II at those positions cannot be shifted out of the left end of the shifter by any possible shift in Stage II or Stage III, it is only necessary to determine if the output bits appearing at OP16 through 31 have already been shifted out of the left end of the shifter by a possible shift in Stage I. The only possible shift in Stage I which could have shifted those bits out of the left end of the shifter is a shift of 48 positions to the left. Therefore, BK16–31 will be TRUE whenever SL48 is TRUE.

Using the same reasoning that is applied to BK16–31 above, it can be seen that BK32–47 should be TRUE whenever SL48 or SL32 is TRUE. Also, using the same reasoning, it can be seen that BK48–63 should be TRUE whenever SL48, SL32 or SL16 is TRUE.

Thus, from the above explanation, it can be seen that whenever the input command indicates a command left shift (L is TRUE) the following logic is applicable to the blocking controls:

$BK0-15\ RING=L$
$BK0=L(SL1+SL2+SL3)$
$BK1=L(SL2+SL3)$
$BK2=L(SL3)$
$BK16-31=L(SL48)$
$BK32-47=L(SL48+SL32)$
$BK48-63=L(SL48+SL32+SL16)$

The blocking controls will now be described in connection with an assumed command right shift, wherein it is desired to block all of the bits which are not effectively shifted out of the left end of the shifter.

BK0–15 RING should never be TRUE because it only concerns bits which are shifted out of the left end of the shifter.

BK0 should be TRUE only if the output of Stage II at OP0 will not be shifted out of the left end of the shifter in Stage III. Thus, BK0 should be TRUE whenever SL0–C is TRUE.

BK1 should be TRUE whenever the output of Stage II at OP1 will not be shifted out of the left end of the shifter in Stage III. Thus, BK1 should be TRUE whenever either SL0–C or SL1 is TRUE.

BK2 should be TRUE whenever the output of Stage II at OP2 will not be shifted out of the left end of the shifter in Stage III. Thus, BK2 should be TRUE whenever SL0–C, SL1 or SL2 is TRUE.

BK3 should always be TRUE because the output of Stage II at OP3 can never be shifted out of the left end of the shifter by any possible shift in Stage III.

BK4–15 should always be TRUE because it only concerns bits which are not shifted out of the left end of the shifter.

The bits appearing at the input to Stage II at positions IP16 through IP31 cannot be shifted out of the left end of the shifter by any possible shifts in Stages II or III. Thus, those bits should always be blocked from the output of Stage II unless they have already been shifted out of the left end of the shifter in Stage I. Since the latter can be accomplished only by a shift of 48 positions in Stage I, BK16–31 should be TRUE whenever either SL0–A, SL16 or SL32 is TRUE.

Using the same reasoning applied above to BK16–31, it can be seen that BK32–47 should be TRUE whenever either SL0–A or SL16 is TRUE, and BK48–63 should be TRUE whenever SL0–A is TRUE.

Figure 7A:
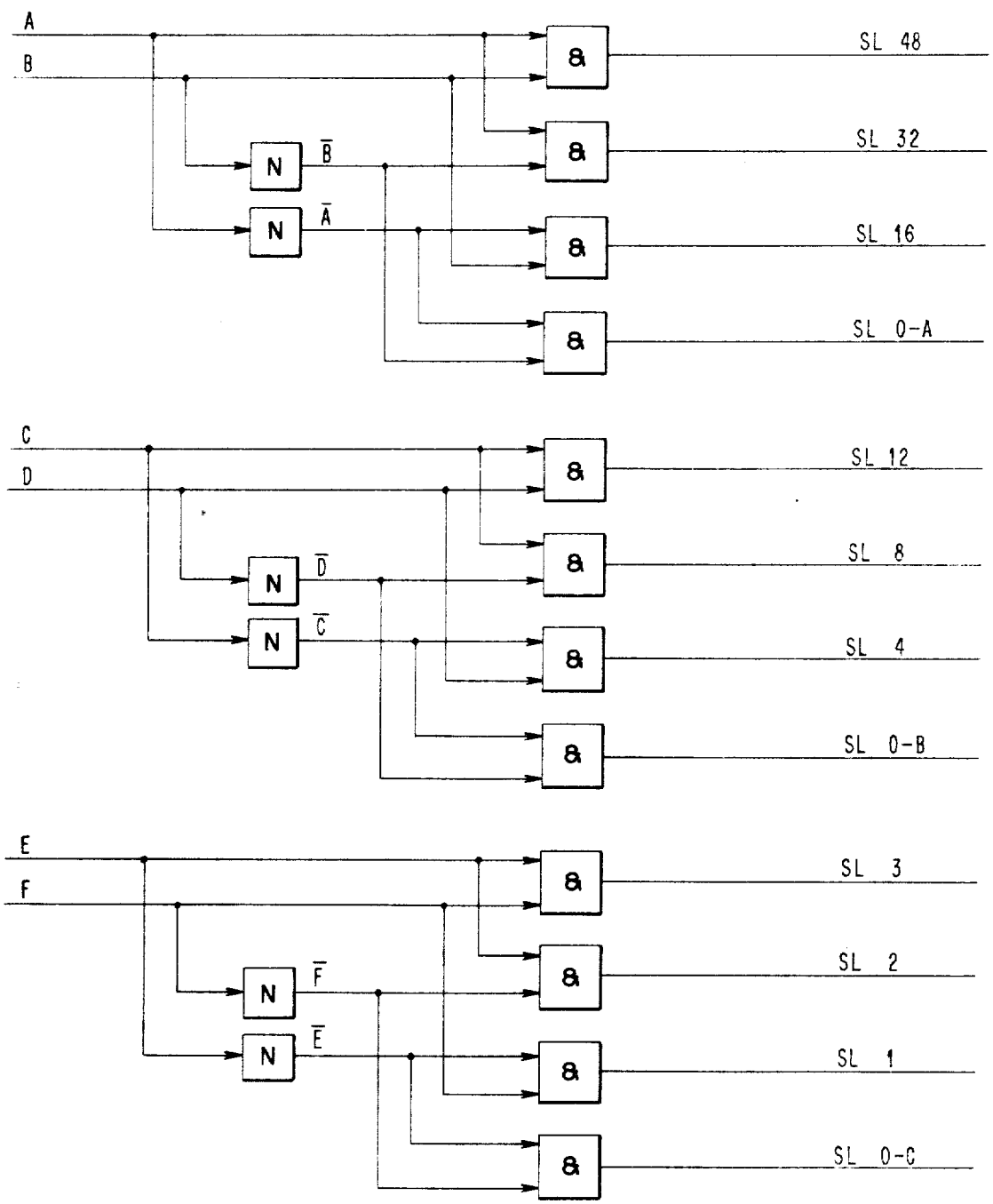
FIGS. 7A and 7B are logic circuits illustrating one example of a decoding circuit that may be used in conjunction with the present invention.
Figure 7B:
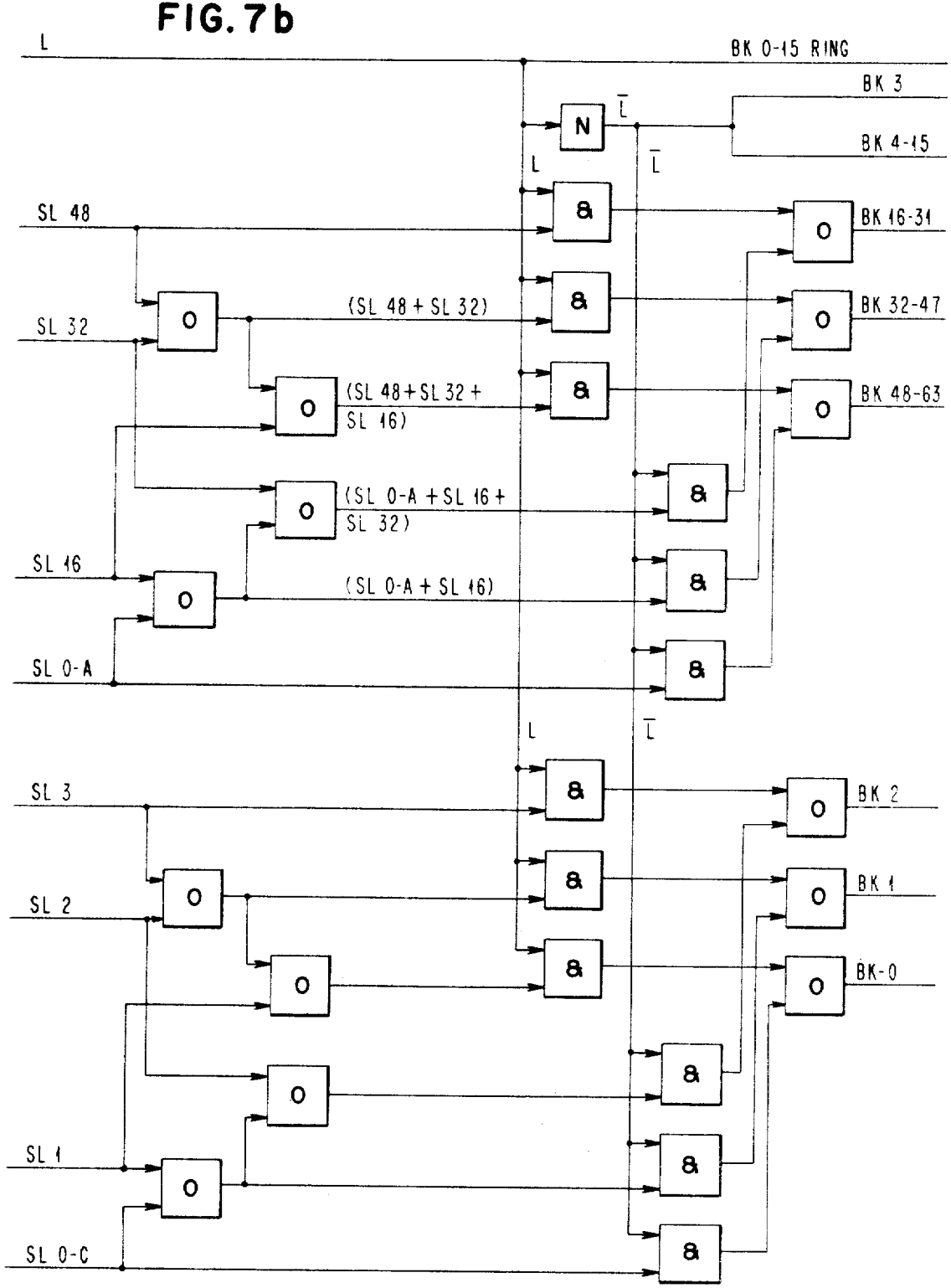

From the above explanation, the following equations are applicable whenever there is a command right shift (L is FALSE):

$BK0 = \bar{L}(SL0-C)$
$BK1 = \bar{L}(SL0-C + SL1)$
$BK2 = \bar{L}(SL0-C + SL1 + SL2)$
$BK3 = \bar{L}$
$BK4-15 = \bar{L}$
$BK16-31 = \bar{L}(SL0-A + SL16 + SL32)$
$BK32-47 = \bar{L}(SL0-A + SL16)$
$BK48-63 = \bar{L}(SL0-A)$ Combining the equations for the blocking controls when there is a command left input with those when there is a command right input results in the following Boolean expressions for the blocking controls:

$BK0-15\ RING = L$
$BK0 = L(SL1 + SL2 + SL3) + \bar{L}(SL0-C)$
$BK1 = L(SL2 + SL3) + \bar{L}(SL0-C + SL1)$
$BK2 = L(SL3) + \bar{L}(SL0-C + SL1 + SL2)$
$BK3 = \bar{L}$
$BK4-15 = \bar{L}$
$BK16-31 = L(SL48) + \bar{L}(SL0-A + SL16 + SL32)$
$BK32-47 = L(SL48 + SL32) + \bar{L}(SL0-A + SL16)$
$BK48-63 = L(SL48 + SL32 + SL16 + \bar{L}(SL0-A)$ The above Boolean equations for the blocking controls and also for the shifting controls are sufficient to teach anyone having ordinary skill in the art to which the invention pertains how to make and use a decoding logic circuit which is capable of receiving a 7 bit input code and providing the proper control outputs to the three stages of the shifter. A logic diagram of the decoder, implemented in accordance with the Boolean equations above is shown in FIGS. 7A and 7B. In those figures the logic elements having an ampersand therein represent AND gates, the logic elements having a 0 therein represent OR gates and the logic elements having an N therein represent NOT gates.

While the invention has been particularly shown and described with reference to a preferred embodiment thereof, it will be understood by those skilled in the art that various changes in form and details may be made therein without departing from the spirit and scope of the invention.

What is claimed is:
1. Apparatus for effectively shifting a data word either to the right or to the left in response to a command word representing the direction and magnitude of the described shift, said apparatus comprising:
   (a) a plurality of groups of X terminals,
   (b) a plurality of logic stage means interconnecting each two successive groups of terminals, said successive groups of terminals being the X input terminals and X output terminals respectively of the logic stage means to which they are connected,
   (c) a separate plurality of command leads connected to each of said logic stage means,
   (d) shift signal generating means, connected to said command leads, responsive to said command word for generating a shift signal on one of each of said plurality of command leads, the command leads energized by said shift signals representing the total amount of shift in a single direction necessary to carry out said command,
   (e) each said logic stage means comprising, gating means responsive to the appearance of a shift signal on one of said plurality of command leads connected thereto for ring shifting a word at said input terminals to said output terminals one of at least four prewired shift amounts in said single direction, including zero shift amount, the particular one of said prewired amounts shifted being dependent upon the particular command lead carrying said shift signal, said smallest non-zero finite amount prewired into any logic stage being an integral sub-multiple of X and the other non-zero-finite amounts being integral multiples of said smallest non-zero amount, and
   (f) blocking means, connected to said gating means in one of said logic stage means, responsive to said command word for blocking selected ones of the bits in the word appearing at the input terminals of said logic stage means from appearing at the output terminals of said logic stage means, said selected one of bits being those which must be blocked to accomplish a logical shift the command amount in the command direction.

2. A digital shifter as claimed in claim 1 wherein the largest of all the prewired shift amounts in any logic stage means is less than the smallest non-zero prewired amount in the preceding logic stage means.

3. A digital shifter as claimed in claim 1 having at least at first and second logic stage, each stage having four command leads connected thereto, only one command lead to each stage being energized at any one time, said gating means in said first stage comprising means responsive to a shift signal on a first command lead for passing the input word to the output unshifted, means responsive to a shift signal on a second command lead for ring shifting the input word $n$ bit positions in said single direction, where $n = X/4$, means responsive to a shift signal on a third command lead for ring shifting the input word $2n$ bit positions in said single direction, and means responsive to a shift signal on a fourth command lead for ring shifting the input word $3n$ bit positions in said single direction, the output of said first stage being applied to the input of said second stage.

4. A digitial shifter as claimed in claim 3 wherein said gating means in said second stage comprises means responsive to a shift signal on a first command lead applied thereto for passing the input to the output unshifted, means responsive to a shift signal on a second command lead applied thereto for ring shifting the input $m$ bit positions in said single direction where $m = n/4$, means responsive to a shift signal on a third command lead applied thereto for ring shifting the input $2m$ bit positions in said single direction, and means responsive to a shift signal on a fourth command lead applied thereto for ring shifting the input $3m$ bit positions in said single direction.

5. A digital shifter as claimed in claim 4 wherein said blocking means comprises a plurality of blocking control input leads applied to said gating means of said second stage for selectively blocking any group of bits in said original input word from appearing in the output of said second stage, a decoding circuit means responsive to said command word for selectively energizing said blocking control input leads to block the $y$ lowest order bits of said original word from appearing in said second stage output when said command is a left shift of $y$ bit positions and for selectively energizing said blocking control input leads to block the $y$ highest order bits of said original word from appearing in said second stage output when said command is a right shift of $y$ bit positions.

6. A digital shifter for providing a ring shift to the left or to the right of from zero to sixty-three bit positions of an input word having a maximum width of sixty-four bits in response to a command direction and a command amount comprising three shifter stages each having four shift control inputs applied thereto and said second stage having plural blocking control inputs applied thereto, each of said three stages having 64 inputs and 64 outputs, the outputs of said first and second stages being connected to the inputs of said second and third stages respectively, said first stage comprising, first gating circuit means responsive to the energization of a first shift control input for shifting the input zero bit position, second gating circuit means responsive to the energization of a second shift control input for ring shifting the input sixteen bit positions to the left, third gating means responsive to the energization of a third shift control input for ring shifting the input thirty-two positions to the left, fourth gating means responsive to the energization of a fourth shift control input for ring shifting the input forty-eight bit positions to the left, said second stage comprising, fifth gating means responsive to the energization of the first shift control input applied thereto for ring shifting the input zero bit positions, sixth gating means responsive to the energization of the second shift control input applied thereto for ring shifting the input four bit positions to the left, seventh gating means responsive to the third shift control input applied thereto for ring shifting the input eight bit positions to the left, eighth gating means responsive to the fourth shift control input applied thereto for ring shifting the input twelve bit positions to the left, said fifth, sixth, seventh and eighth gating means being responsive to the pattern of energization of said blocking control inputs for blocking any selected group of successive bits in the original input word from appearing in the output of said second stage, said third stage comprising ninth gating means responsive to the energization of the first shift control input applied thereto for shifting the input zero bit positions, tenth gating means responsive to the second shift control input applied thereto for ring shifting the input one bit position to the left, eleventh gating means responsive to the energization of the third shift control input applied thereto for ring shifting the input two bit positions to the left, twelfth gating means responsive to the energization of the fourth shift control input applied thereto for ring shifting the input three bit positions to the left, and decoding means responsive to said command amount and command direction for selectively energizing one shift control input to each of said stages and a group of said blocking control inputs to provide a total left shift of the input word an amount equal to the command amount and a blocking of all bits of said input to be shifted out of the left end of any stage of the shifter when the command direction is left, and to provide a total left shift of the input word an amount equal to the two's complement of the command amount and a blocking of all bits of said input not shifted out of the left end of any stage of the shifter when the command direction is right.

References Cited

UNITED STATES PATENTS

| 3,210,737 | 10/1965 | Perry et al. | 340—172.5 |
|---|---|---|---|
| 3,239,764 | 3/1966 | Verma et al. | 328—37 |
| 3,274,556 | 9/1966 | Paul et al. | 340—172.5 |
| 3,311,896 | 3/1967 | Delmege et al. | 340—172.5 |
| 3,350,692 | 10/1967 | Cagle et al. | 340—172.5 |
| 3,374,463 | 3/1968 | Muir | 340—172.5 |
| 3,374,468 | 3/1968 | Muir | 340—172.5 |

PAUL J. HENON, Primary Examiner

P. R. WOODS, Assistant Examiner

UNITED STATES PATENT OFFICE
CERTIFICATE OF CORRECTION

Patent No. 3,510,846          Dated May 5, 1970

Inventor(s) Robert E. Goldschmidt et al

It is certified that error appears in the above-identified patent and that said Letters Patent are hereby corrected as shown below:

| | |
|---|---|
| Column 1, line 66 | "around he" should be --around the-- |
| Column 2, line 6 | "be cause" should be --because-- |
| Column 2, line 55 | "lower" should be --low-- |
| Column 4, line 4 | "same" omitted after "In the" |
| Column 4, line 41 | "SL-A" should be --SLO-A-- |
| Column 4, line 60 | "there" should be --their-- |
| Column 4, line 62 | "parial" should be --partial-- |
| Column 4, line 64 | "OPO" should be --IPO-- |
| Column 5, line 11 | "word" omitted after "input" |
| Column 5, line 28 | "to be desired" should be --to a desired-- |
| Column 5, line 38 | "blocks" omitted after "logic" |
| Column 5, lines 38 & 39 | delete "The logic blocks blocks receives the same ingated positions." |
| Column 11, line 55 | no parenthesis after "+SL16" |

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents